(12) United States Patent
Tamura et al.

(10) Patent No.: US 12,332,262 B2
(45) Date of Patent: Jun. 17, 2025

(54) SPECIMEN TRANSPORT APPARATUS (71) Applicant: Hitachi High-Tech Corporation, Tokyo (JP)

(72) Inventors: Kazuma Tamura, Tokyo (JP); Shigeki Yamaguchi, Tokyo (JP); Hiroshi Watanabe, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 785 days.

(21) Appl. No.: 17/620,783

(22) PCT Filed: Mar. 18, 2020

(86) PCT No.: PCT/JP2020/011970
§ 371 (c)(1),
(2) Date: Dec. 20, 2021

(87) PCT Pub. No.: WO2020/261672
PCT Pub. Date: Dec. 30, 2020

(65) Prior Publication Data
US 2022/0413000 A1 Dec. 29, 2022

(30) Foreign Application Priority Data
Jun. 26, 2019 (JP) .................. 2019-118329

(51) Int. Cl.
G01N 35/04 (2006.01)
B65G 54/02 (2006.01)
G01N 35/02 (2006.01)

(52) U.S. Cl.
CPC ............ G01N 35/04 (2013.01); B65G 54/02 (2013.01); G01N 2035/0406 (2013.01); G01N 2035/0477 (2013.01); G01N 2035/0494 (2013.01)

(58) Field of Classification Search
CPC .......... G01N 35/04; G01N 2035/0406; G01N 2035/0477; G01N 2035/0494; B65G 54/02
See application file for complete search history.

(56) References Cited

U.S. PATENT DOCUMENTS

2017/0096307 A1 4/2017 Mahmudimanesh et al.
2017/0108522 A1 4/2017 Baer
(Continued)

FOREIGN PATENT DOCUMENTS

JP 62-125409 A 6/1987
JP 09-264980 A 10/1997
(Continued)

OTHER PUBLICATIONS

JP 9-264980 Englsih Machine Translation, obtained from Google Patent on Oct. 12, 2024, pp. 1-11. (Year: 2024).*
(Continued)

Primary Examiner — Christine T Mui
(74) Attorney, Agent, or Firm — MATTINGLY & MALUR, PC (57) ABSTRACT The purpose of the present invention is to provide a highly reliable specimen carrier device with which it is possible to position a specimen holder in a specific place with high accuracy, thereby enabling the stable performance of a treatment. In order to achieve this purpose, the present invention provides a specimen carrier device that is equipped with: a specimen holder which retains a specimen container and which is equipped with a magnetic body; and a first positioning means which is disposed beneath a carrier surface and which conveys and stops the specimen holder by attracting and repelling the magnetic body, wherein a second positioning means for pressing the specimen holder or the specimen container is provided on the carrier surface.

6 Claims, 10 Drawing Sheets (56) References Cited

U.S. PATENT DOCUMENTS

2017/0174448 A1    6/2017  Sinz
2017/0212139 A1    7/2017  Jaeggi

FOREIGN PATENT DOCUMENTS

| JP | 2006-128549 A | 5/2006 |
| JP | 2017-072591 A | 4/2017 |
| JP | 2017-527804 A | 9/2017 |

OTHER PUBLICATIONS

International Preliminary Report on Patentability dated Jun. 29, 2021.
International Search Report of PCT/JP2020/011970 dated Jun. 16, 2020.
Translation of International Preliminary Report on Patentability received in corresponding International Application No. PCT/JP2020/011970 dated Jun. 29, 2021.
Chinese Office Action received in corresponding Chinese Application No. 202080046359.6 dated Jan. 3, 2023.
Extended European Search Report received in corresponding European Application No. 20833673.5 dated Apr. 21, 2023.

\* cited by examiner

SPECIMEN TRANSPORT APPARATUS

TECHNICAL FIELD

The present invention relates to a specimen transport apparatus.

BACKGROUND ART

At hospitals and inspection facilities, a specimen such as blood or urine supplied from a patient or the like is analyzed by an analyzer for clinical inspection. Prior to analysis, a specimen inspection automation system performs pretreatment, such as centrifugal separation, uncapping, and dispensing, on the specimen and after the pretreatment, the specimen is transported to an analyzer. For transportation of the specimen in the specimen inspection automation system, a specimen holder that can carry one specimen container containing a specimen is used and transported by sliding on a transport surface.

As the transportation method, a technique is known in which a plurality of electromagnetic actuators fixed and arranged under the transport surface generate a magnetic field to attract or repel the magnet in the specimen holder to enable the specimen holder to slide on the transport surface. For example, Patent Literature 1 describes that when the specimen holder is stopped, "a terminal electromagnetic actuator applies an electromagnetic centering attraction force and an electromagnetic actuator adjacent to the terminal electromagnetic actuator applies a centering repulsive force."

CITATION LIST

Patent Literature

Patent Literature 1: Japanese Unexamined Patent Application Publication (Translation of PCT Application) No. 2017-527804

SUMMARY OF INVENTION

Technical Problem

When only the attraction force and repulsive force of electromagnetic actuators are used for centering of the specimen holder as described in Patent Literature 1, there is a concern that the centering accuracy may fluctuate due to the weight of the specimen holder and the frictional force of the transport surface. If the position at which the specimen holder stops is inaccurate, when inserting or pulling out the specimen container using an arm, the arm or the like might touch the specimen container and in some cases the specimen container might fall.

The object of the present invention is to provide a specimen transport apparatus with high reliability that can position a specimen holder accurately at a specific location to perform a stable treatment.

Solution to Problem

In order to solve the above problem, according to the present invention, a specimen transport apparatus comprises: a specimen holder that holds a specimen container and includes a magnetic body; and a first positioning unit that transports and stops the specimen holder by attracting or repelling the magnetic body, in which a second positioning unit that presses the specimen holder or the specimen container is provided.

Advantageous Effects of Invention

According to the present invention, it is possible to provide a specimen transport apparatus with high reliability that can position a specimen holder accurately at a specific location to perform a stable treatment.

DESCRIPTION OF EMBODIMENTS

Embodiments of the present invention will be described in detail referring to drawings.

First Embodiment

Figure 1:
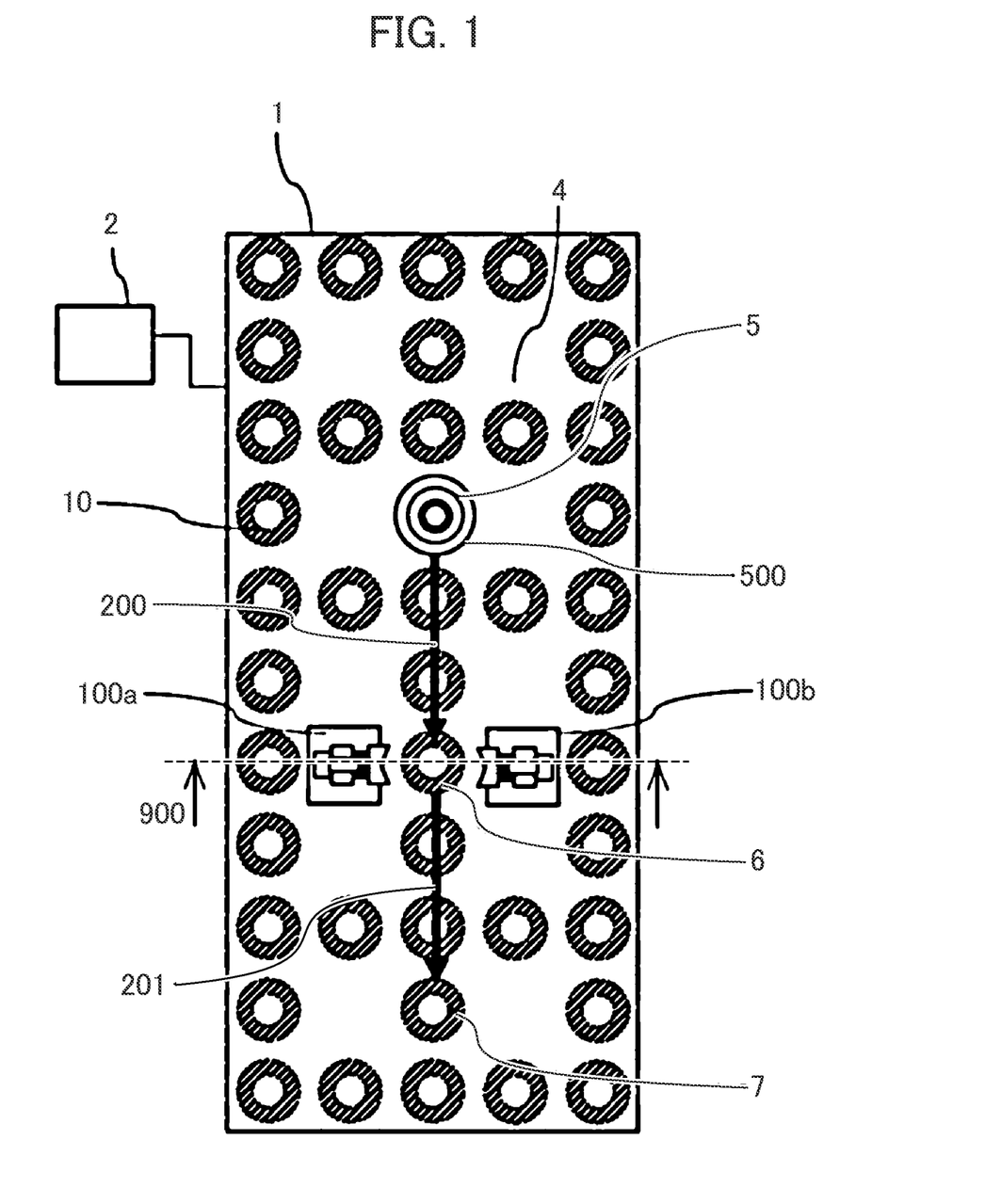
FIG. 1 is a schematic view of a specimen transport apparatus of First Embodiment (at releasing).

FIG. 1 is a schematic view of a specimen transport apparatus according to this embodiment. The upper surface of a transport surface 4 of the specimen transport apparatus 1 connected to a control device 2 is a flat surface with a low frictional force and electromagnetic actuators 10 that can be controlled by the control device 2 are arranged at regular intervals on its back side (lower surface). Here an electromagnetic actuator 10 is an electromagnet comprised of a core as a magnetic body and a winding around the circumference of the core and corresponds to a first positioning unit. At a transport position a section 5, a specimen holder 500 capable of carrying one specimen container stands by while carrying a specimen container 501. The specimen holder 500 has a magnetic body (not shown) in it. Therefore, by supplying an electric current to the electromagnetic actuators 10 through the control device 2 to generate a magnetic field on the transport surface 4, the magnetic body in the specimen holder 500 can be attracted or repelled. As a consequence, the specimen holder 500 can be transported two-dimensionally on the transport surface 4 along the array of the electromagnetic actuators 10. As an example of the magnetic body in the specimen holder 500, a permanent magnet such as neodymium or ferrite is desirable but instead another type of magnet or soft magnetic body may be used.

Also, an arm for gripping the specimen container 501 is provided above a transport position b section 6. When the specimen holder 500 is transported to the transport position b section 6, the specimen container 501 held by the specimen holder 500 can be gripped and inserted or pulled out by the arm. Also, pressing mechanisms 100*a* and 100*b* that move horizontally to press the specimen holder 500 are located symmetrically on both sides with the transport position b section 6 between them.

Figure 2:
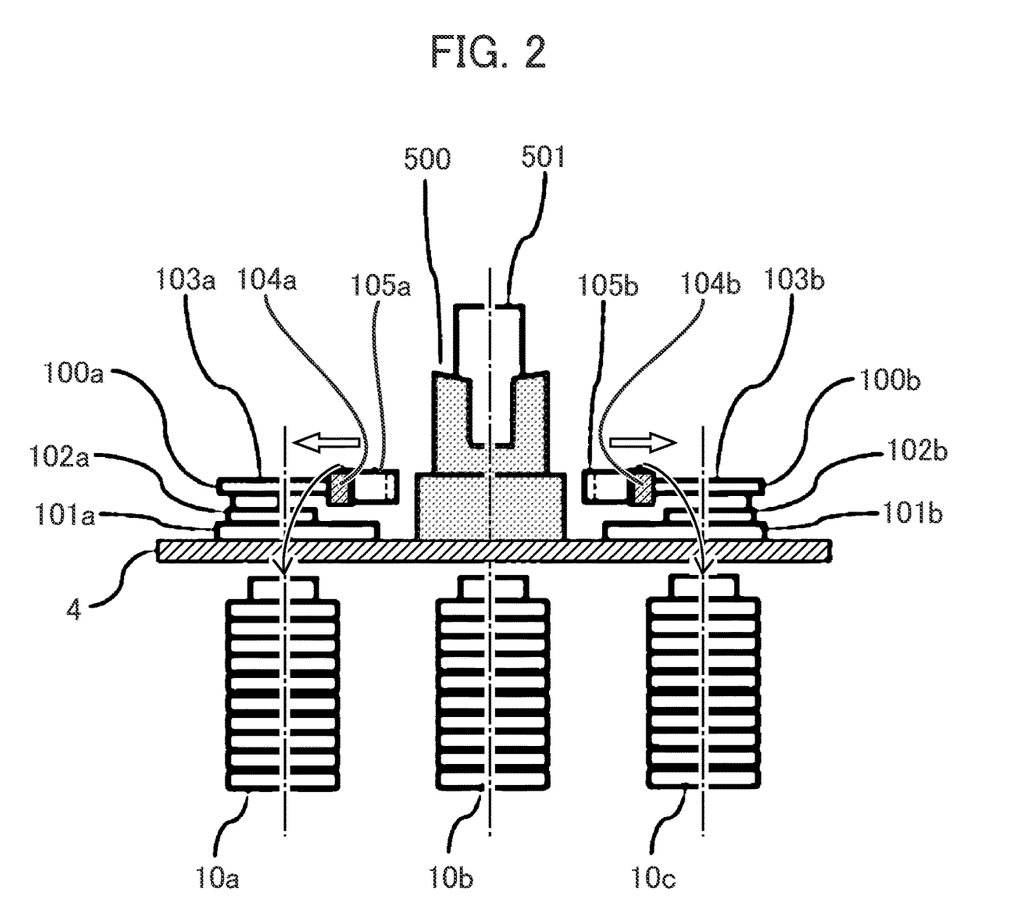
FIG. 2 is a sectional view of a pressing mechanism of First Embodiment (at releasing).

FIG. 2 is a sectional view of the transport position b section 6 as seen from arrows 900 in FIG. 1. Under the transport surface 4, electromagnetic actuators 10*a*, 10*b*, and 10*c* are arranged. The pressing mechanism 100*a* is located just above the electromagnetic actuator 10*a* with the transport surface 4 between them and the pressing mechanism 100*b* is located just above the electromagnetic actuator 10*c* with the transport surface 4 between them.

Here, the pressing mechanism 100*a* that corresponds to the second positioning unit is mainly comprised of a transport surface installation section 101*a*, a slide section 102*a*, and a pressing movable section 103*a*. The transport surface installation section 101*a* is fixed on the transport surface 4, the slide section 102*a* is movably fixed on the transport surface installation section 101*a*, and the pressing movable section 103*a* is fixed on the slide section 102*a*. The pressing movable section 103*a* has a tip section 105*a* with a concave portion in the center and a permanent magnet 104*a*. The concave portion makes it easy to bring the specimen holder 500 to the center of the pressing movable section 103*a* when the pressing mechanism 100*a* presses the specimen holder 500, contributing to correction of a position error of the specimen holder 500. For the permanent magnet 104*a*, another type of magnetic body may be used.

As the electromagnetic actuator 10*a* generates a magnetic field on the transport surface 4, an electromagnetic force is exerted on the permanent magnet 104*a* of the pressing movable section 103*a* and the pressing movable section 103*a* moves along the direction of the slide section 102*a*. FIG. 2 shows a state that the pressing mechanism 100*a* is most open.

Here, the range of movement of the permanent magnet 104*a* is limited so that it is always more inward than the axis of the electromagnetic actuator 10*a* (toward the electromagnetic actuator 10*b*). This can prevent the pressing movable section 103*a* from moving in the opposite direction accidentally. The pressing mechanism 100*b* is structured in the same way as the pressing mechanism 100*a*.

Next, the method for transporting the specimen holder 500 will be explained. In this embodiment, an explanation is made of the case that the specimen holder 500 is transported from the transport position a section 5 to the transport position b section 6 according to the transport route 200 in FIG. 1.

First, when the specimen holder 500 is at the transport position a section 5, the electromagnetic actuator just below the specimen holder 500 generates a magnetic field that exerts a repulsive force on the magnetic body of the specimen holder 500. At this time, the adjacent electromagnetic actuator in the direction of movement generates a magnetic field that exerts an attraction force on the magnetic body of the specimen holder 500. The repulsive force and attraction force add a thrust force to the magnetic body of the specimen holder 500 in the direction of movement and the specimen holder 500 slides on the transport surface 4 and moves to just above the adjacent electromagnetic actuator in the direction of movement. By repeating the control of attraction and repulsion by the electromagnetic actuators, the specimen holder 500 arrives at the transport position b section 6. However, the specimen holder 500 stops at a position not a little off the axis of the electromagnetic actuator just below the transport position b section 6.

After the electromagnetic actuators as the first positioning unit transport the specimen holder 500 to the vicinity of the axis of the electromagnetic actuator 10*b* as the target position and stops it there, the pressing mechanisms 100*a* and 100*b* as the second positioning unit move the specimen holder 500 closer to the axis of the electromagnetic actuator 10*b*. Next, the method for centering the specimen holder 500 stopped at an inaccurate position to the axis of the electromagnetic actuator 10*b* will be explained.

Figure 3:
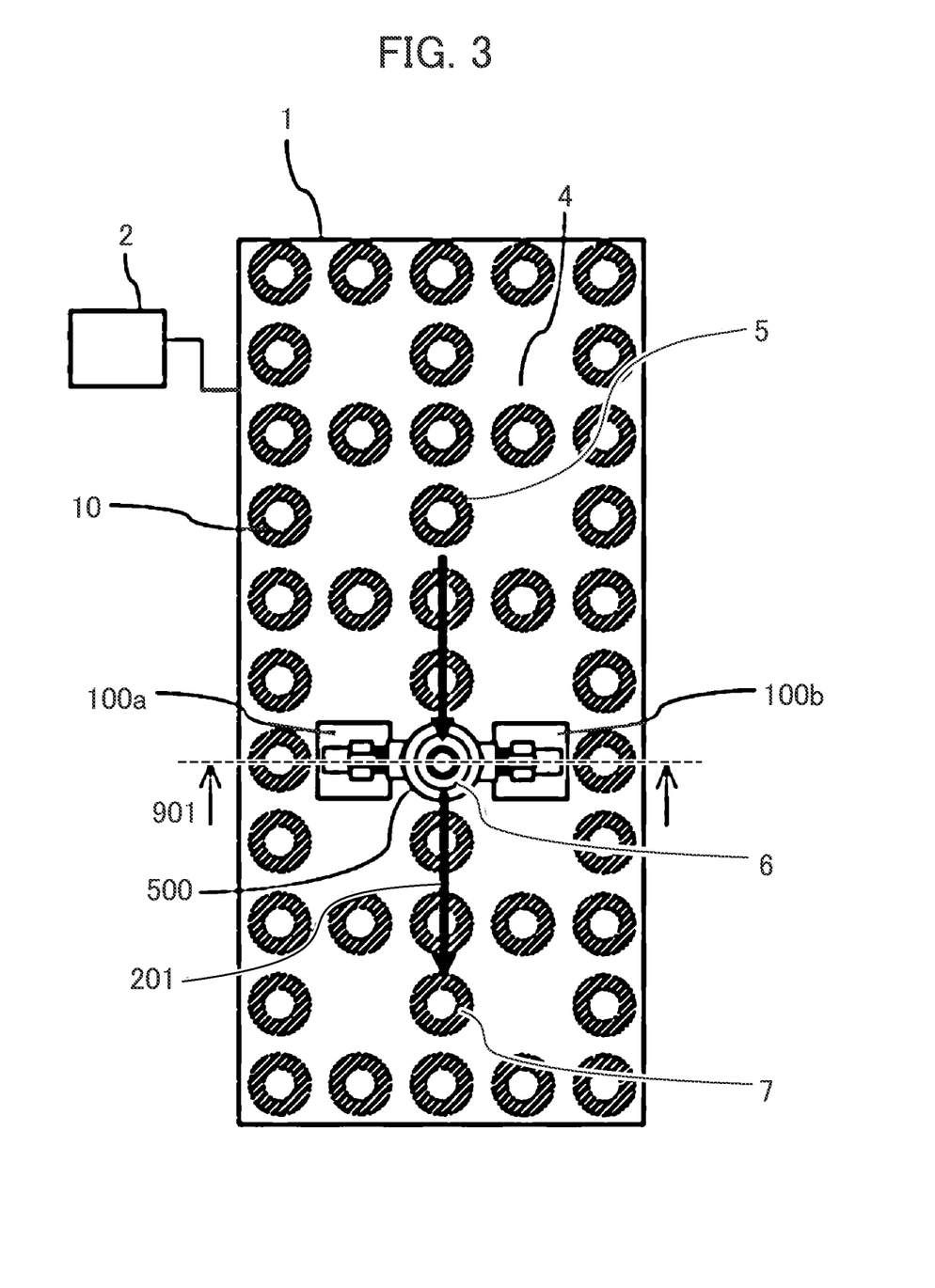
FIG. 3 is a schematic view of the specimen transport apparatus of First Embodiment (at pressing).
Figure 4:
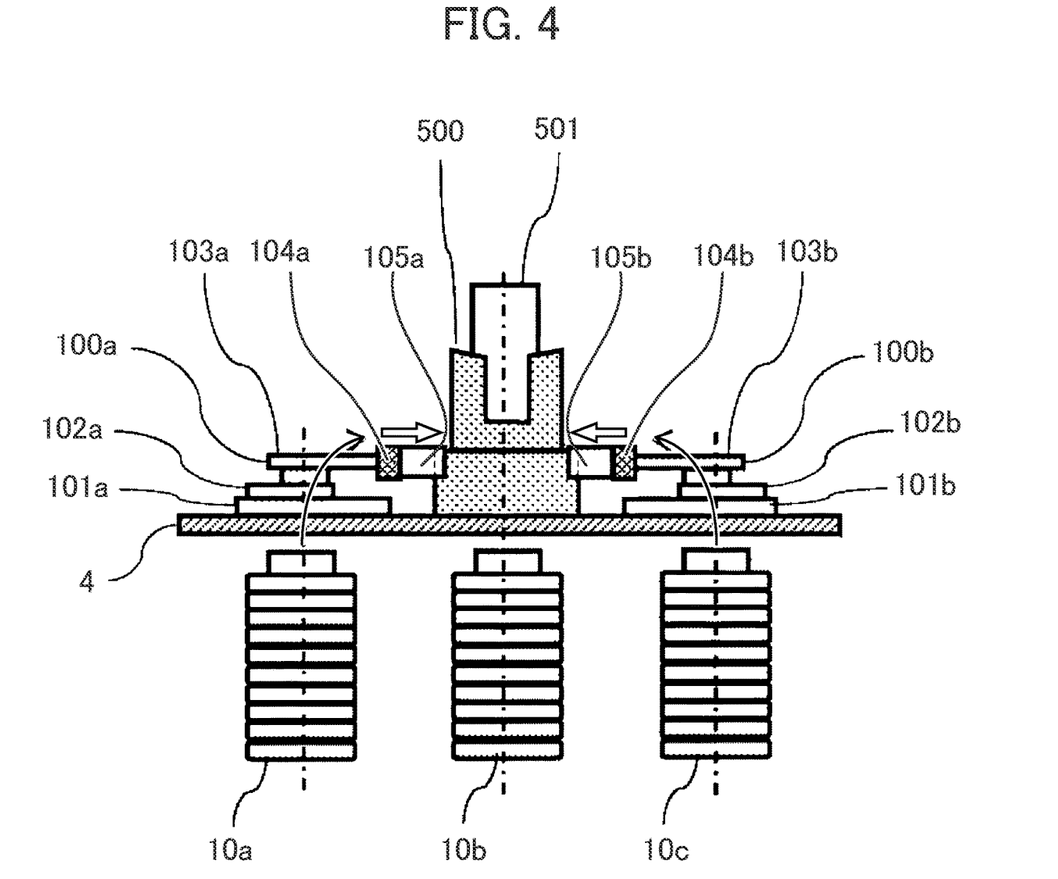
FIG. 4 is a sectional view of the pressing mechanism of First Embodiment (at pressing).

Specifically, first, the current supply to the electromagnetic actuator 10*b* is turned off to stop the attraction force exerted on the magnetic body of the specimen holder 500. Then, an electric current is supplied to the electromagnetic actuator 10*a* just below the pressing mechanism 100*a* and the electromagnetic actuator 10*c* just below the pressing mechanism 100*b* simultaneously. At this time, the current should be directed so that a repulsive force is exerted on the permanent magnets 104*a* and 104*b* of the pressing movable sections. This applies a force to the permanent magnets 104*a* and 104*b* in the direction of moving away from the electromagnetic actuators (toward the electromagnetic actuator 10*b*). As a consequence, the pressing movable sections 103*a* and 103*b* move inward and sandwich the specimen holder 500 from opposite directions as shown in FIG. 3 and FIG. 4 so that the position error of the specimen holder 500 can be corrected. FIG. 4 is a sectional view as seen from arrows 901 in FIG. 3.

As centering of the specimen holder 500 is completed, the arm (not shown) goes down and grips the specimen container 501 on the specimen holder 500, and then it goes up to pull out the specimen container 501. The specimen container 501 pulled out is transported to another transport apparatus, analyzer or the like, as it is.

In order to transport the emptied specimen holder 500 again, an electric current is supplied to the electromagnetic actuator 10*a* and electromagnetic actuator 10*c* simultaneously in such a direction that an attraction force is exerted on the permanent magnets 104*a* and 104*b*. This applies a force to the permanent magnets 104*a* and 104*b* in the direction of moving closer to the electromagnetic actuators and the pressing movable sections 103*a* and 103*b* move outward or in the direction opposite to the direction of centering and the specimen holder 500 is released from the pressed state. After that, the specimen holder 500 is transported to a transport position c section 7 by the electromagnetic actuators according to a transport route 201.

As mentioned above, this embodiment includes not only the first positioning unit (electromagnetic actuators) located under the transport surface 4 to transport and stop the specimen holder 500 magnetically, but also the second positioning unit (pressing mechanisms) located on the transport surface 4 to press the specimen holder 500 mechanically. Therefore, even if the position at which the specimen holder 500 stops is inaccurate, the second positioning unit contacts the specimen holder 500 physically to correct the position error. As a consequence, when inserting or pulling out the specimen container 501, the arm is prevented from touching the specimen container 501 and when inserting a dispensing probe into the specimen container 501 or pulling it out of the specimen container 501, the probe is prevented from touching the specimen container 501.

In addition, in this embodiment, since the electromagnets of the electromagnetic actuators as the first positioning unit are used to activate the second positioning unit (pressing mechanisms), it is unnecessary to add a new actuator on the transport surface 4. This not only prevents deterioration of the specimen due to the heat that the new actuator might generate, but also eliminates the need to increase the size of the specimen transport apparatus.

Although the object to be pressed by the pressing mechanisms is the specimen holder 500 in this embodiment, instead it may be the specimen container 501. Also, in this embodiment, the tip sections of the pressing movable sections 103a and 103b that are the surfaces to come into contact with the specimen holder 500 have a concave portion, but the invention is not limited thereto. For example, the pressing movable sections 103a and 103b may each have a bearing at the tip so that when the specimen holder 500 is pressed, the specimen holder 500 gets into between the two bearings to correct the position error.

Second Embodiment

Figure 5:
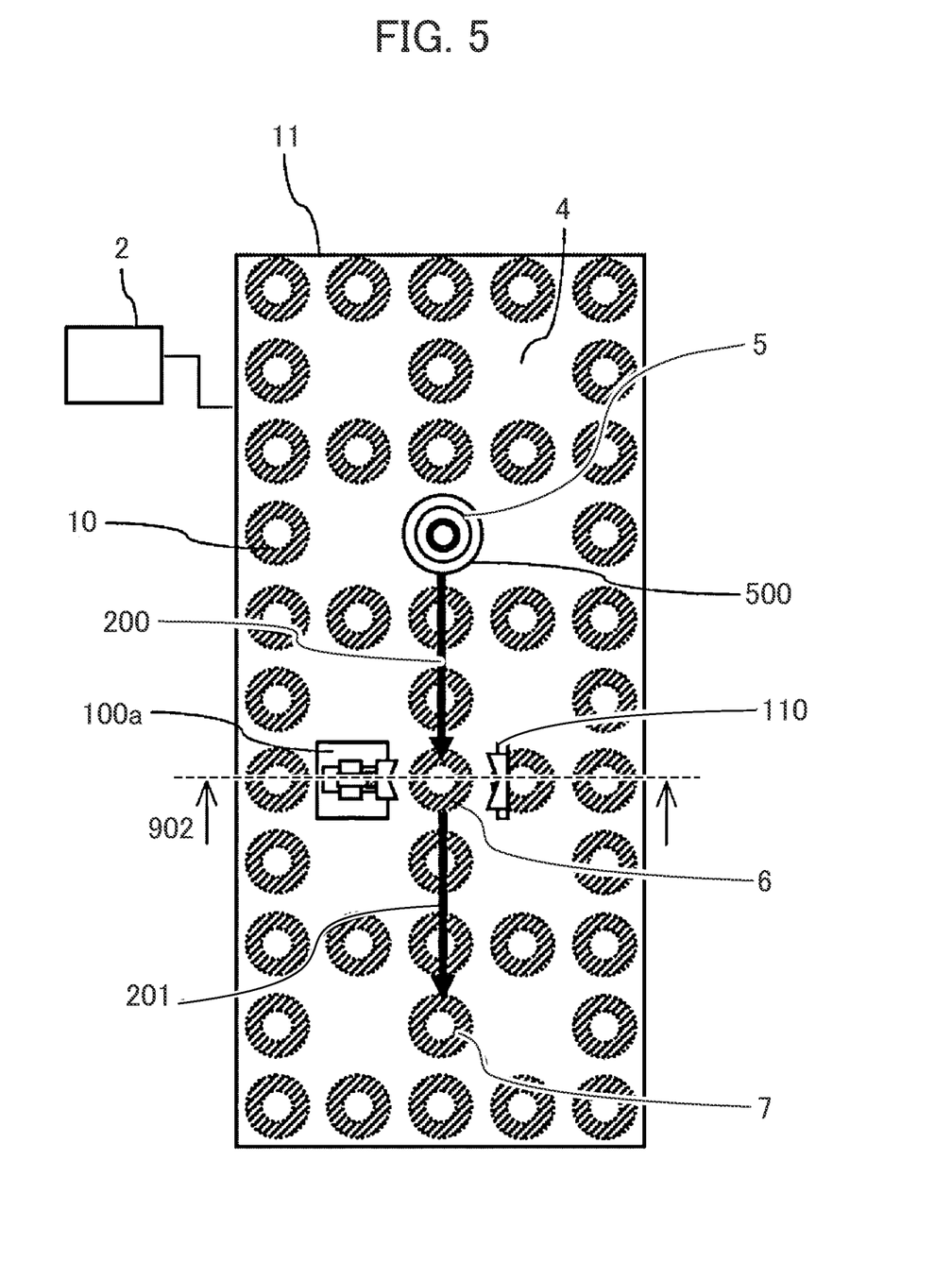
FIG. 5 is a schematic view of a specimen transport apparatus of Second Embodiment (at releasing).
Figure 6:
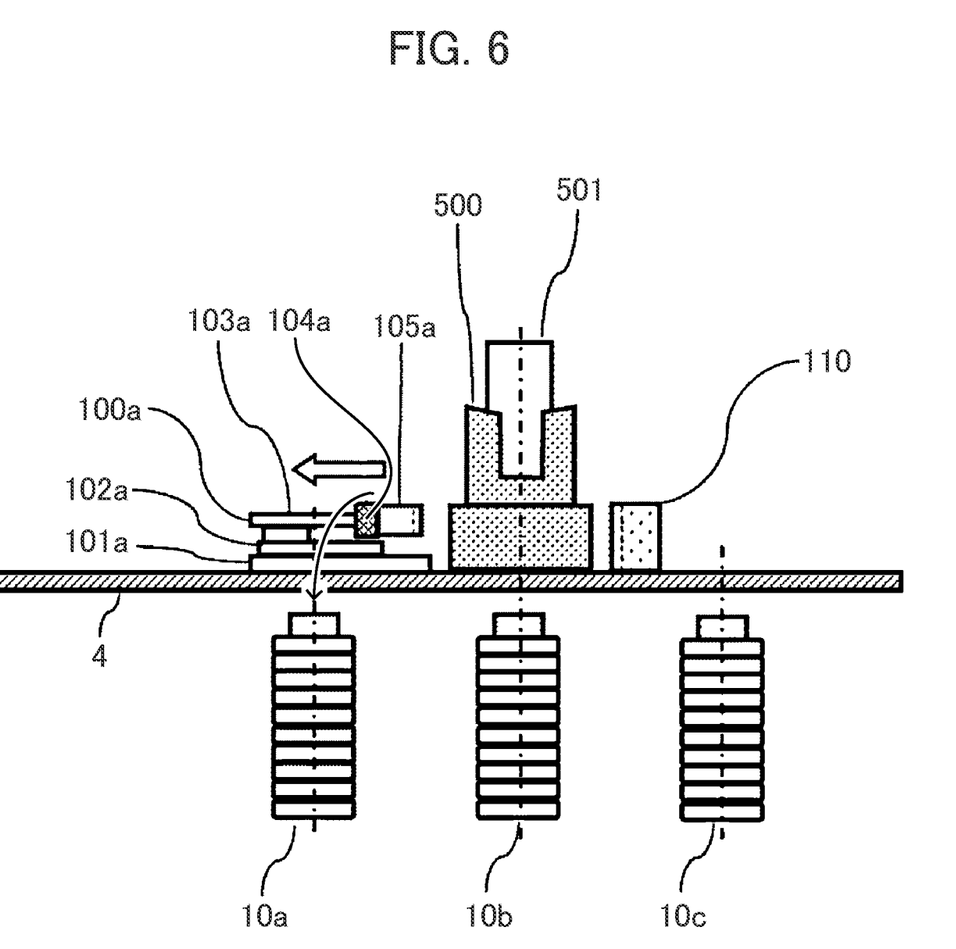
FIG. 6 is a sectional view of a pressing mechanism of Second Embodiment (at releasing).

FIG. 5 and FIG. 6 show the structure of the specimen transport apparatus 11 according to the second embodiment. FIG. 6 is a sectional view as seen from arrows 902 in FIG. 5. This embodiment is different from the first embodiment in the structure for centering of the specimen holder 500 at the transport position b section 6. Specifically, in this embodiment, the pressing mechanism 100a is provided only on one side and a screen 110 for pressing is fixed on the transport surface 4 on the other side.

Figure 7:
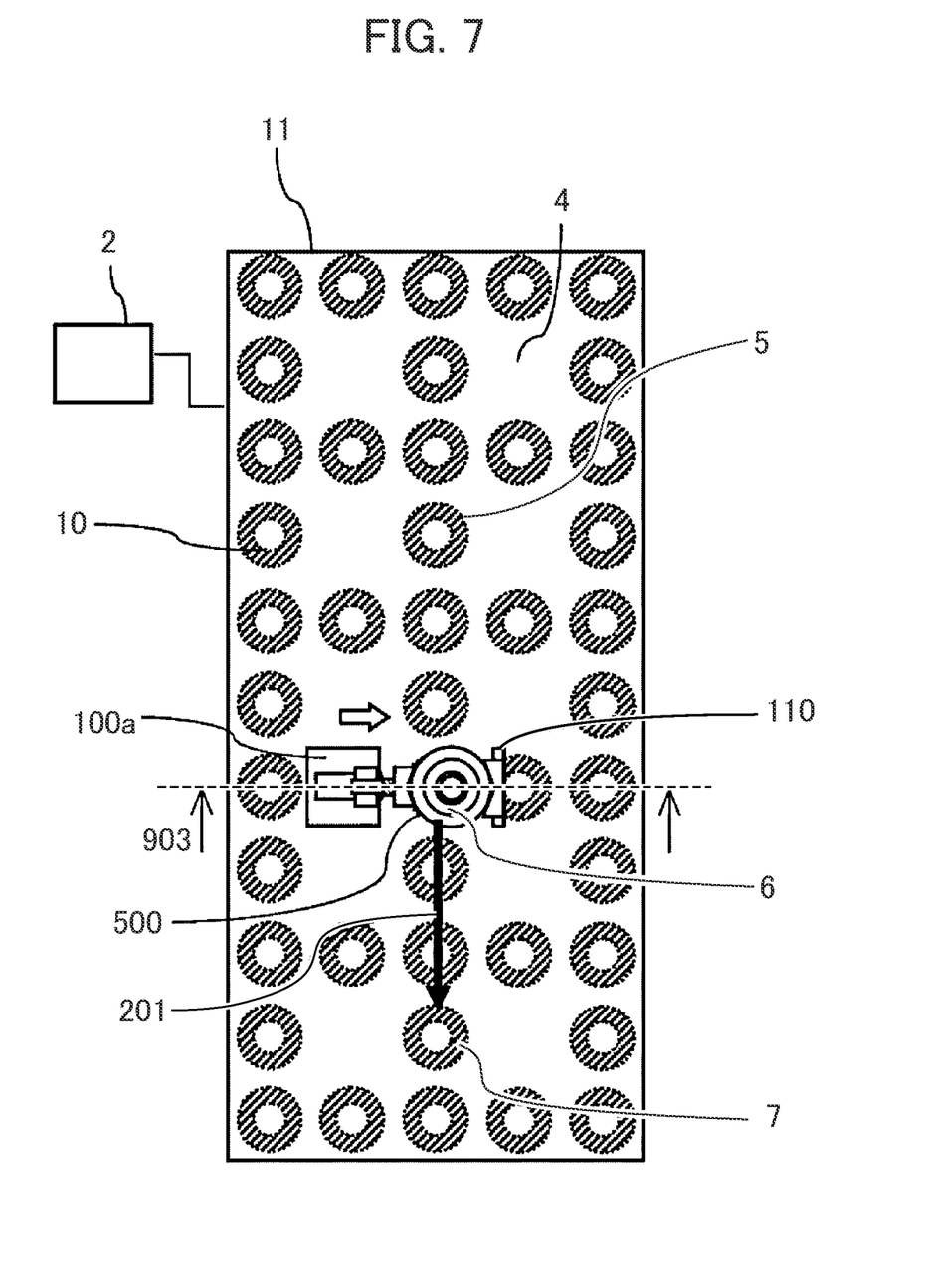
FIG. 7 is a schematic view of the specimen transport apparatus of Second Embodiment (at pressing).
Figure 8:
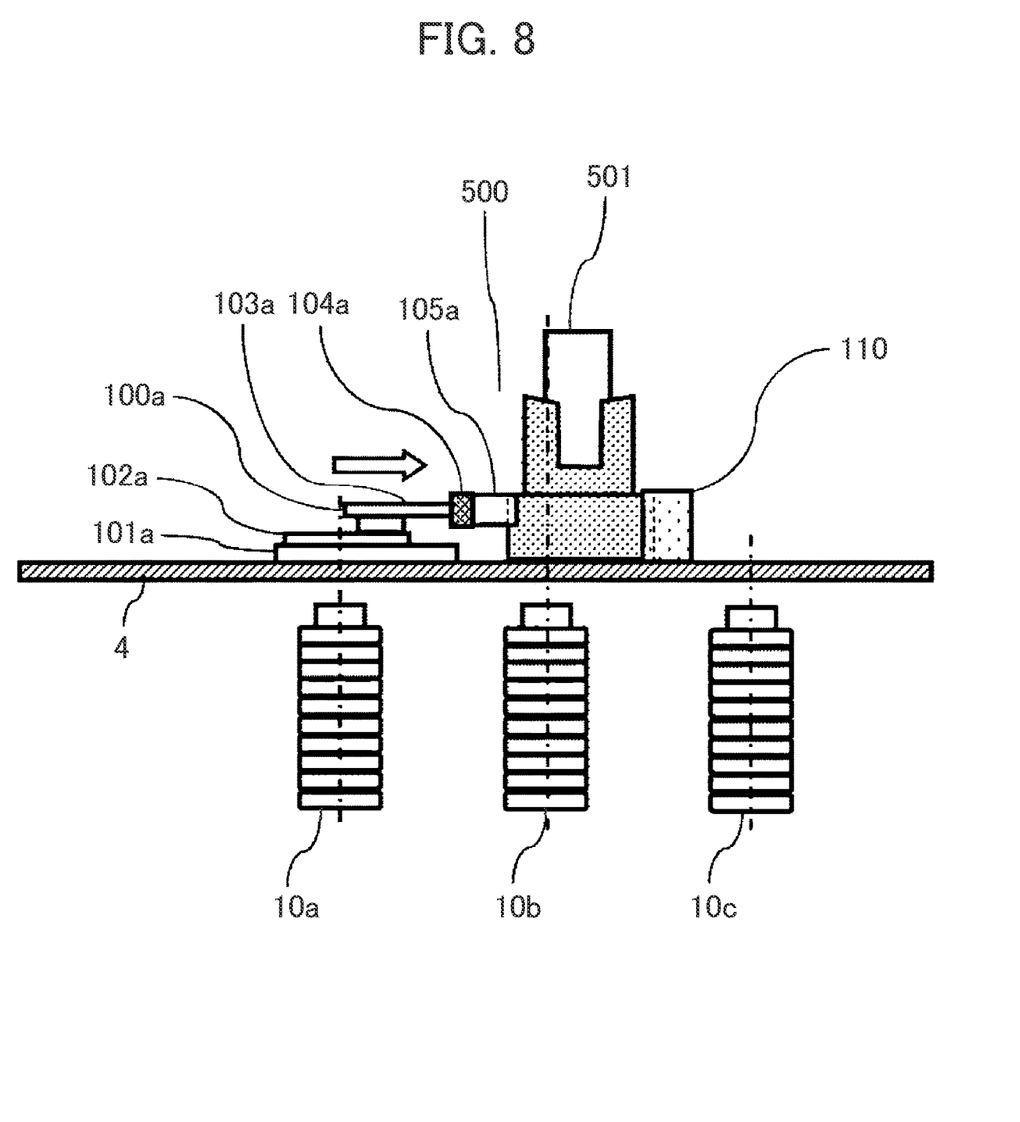
FIG. 8 is a sectional view of the pressing mechanism of Second Embodiment (at pressing).

Next, the method for centering the specimen holder 500 in this embodiment will be explained. As the specimen holder 500 is transported to the vicinity of the area just above the electromagnetic actuator 10b, the current supply to the electromagnetic actuator 10b is turned off to stop the attraction force exerted on the magnetic body of the specimen holder 500. After that, an electric current is supplied to the electromagnetic actuator 10a just below the pressing mechanism 100a in such a direction that a repulsive force is exerted on the permanent magnet 104a of the pressing movable section 103a. This applies a force to the permanent magnet 104a in the direction of moving away from the electromagnetic actuator 10a (toward the electromagnetic actuator 10b). As a consequence, the pressing movable section 103a moves inward and as shown in FIG. 7 and FIG. 8, the specimen holder 500 is pressed against the screen 110 to correct the position error of the specimen holder 500. FIG. 8 is a sectional view as seen from arrows 903 in FIG. 7.

However, the specimen holder 500 is centered not on the axis of the electromagnetic actuator 10b but at the position where it is pressed against the screen 110. Therefore, when inserting or pulling out the specimen container 501, the arm is moved to that position.

After insertion or pulling out of the specimen container 501 is completed, in order to transport the emptied specimen holder 500 again, an electric current is supplied to the electromagnetic actuator 10a in such a direction that an attraction force is exerted on the permanent magnet 104a. Consequently, the pressing movable section 103a moves outward or in the direction opposite to the direction of centering (toward the electromagnetic actuator 10a) and the specimen holder 500 is released from the pressed state.

At this time, the specimen holder 500 is not just above the electromagnetic actuator 10b and if it is transported to the transport position c section 7 as it is, transportation would not be performed correctly due to the concave portion of the screen 110. Therefore, the electromagnetic actuator 10b is used to attract the magnetic body of the specimen holder 500 to move the specimen holder 500 to just above the electromagnetic actuator 10b. After that, the specimen holder 500 is transported from the transport position a section 5 to the transport position b section 6 in the same way as in the first embodiment.

If the screen 110 has a flat surface without a concave portion, centering can be performed because the tip section 105a of the pressing mechanism 100a has a concave portion. Therefore, the screen 110 without a concave portion can be installed at a position away from the axis of the electromagnetic actuator 10b by the distance equivalent to the radius of the specimen holder 500. In this case, when the tip section 105a of the pressing mechanism 100a presses the specimen holder 500, the specimen holder 500 is centered to the vicinity of the axis of the electromagnetic actuator 10b, so it is unnecessary to perform control to move the specimen holder 500 to just above the electromagnetic actuator 10b by attracting the magnetic body of the specimen holder 500.

According to this embodiment, since the second positioning unit to press the specimen holder 500 is provided as in the first embodiment, it is possible to provide a specimen transport apparatus with high reliability that can position the specimen holder 500 at a specific location accurately to perform a stable treatment. Furthermore, in this embodiment, since the screen 110 fixed on the transport surface 4 constitutes part of the second positioning unit and only one pressing mechanism is used, it is possible to provide a more inexpensive specimen transport apparatus than in the first embodiment.

If the second positioning unit is structured to hold the specimen holder 500 at multiple places physically, some of the multiple places may be fixed. However, from the viewpoint of improvement in centering accuracy, it is desirable that contact with the specimen holder 500 should be made at two or more places on one side and contact with the specimen holder 500 should be made at two or more places on the other side, too.

Third Embodiment

Figure 9:
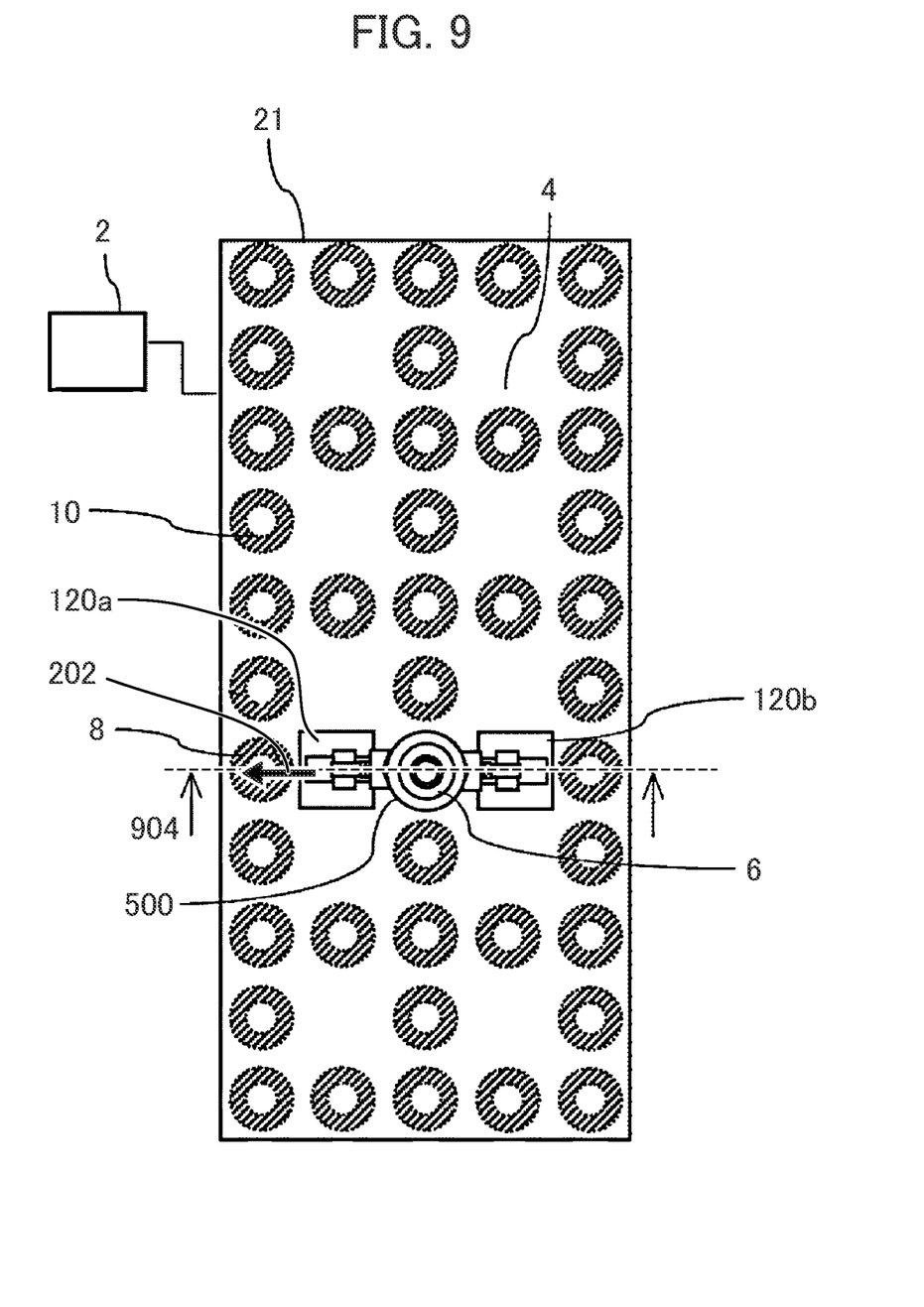
FIG. 9 is a schematic view of a specimen transport apparatus of Third Embodiment (at pressing).
Figure 10:
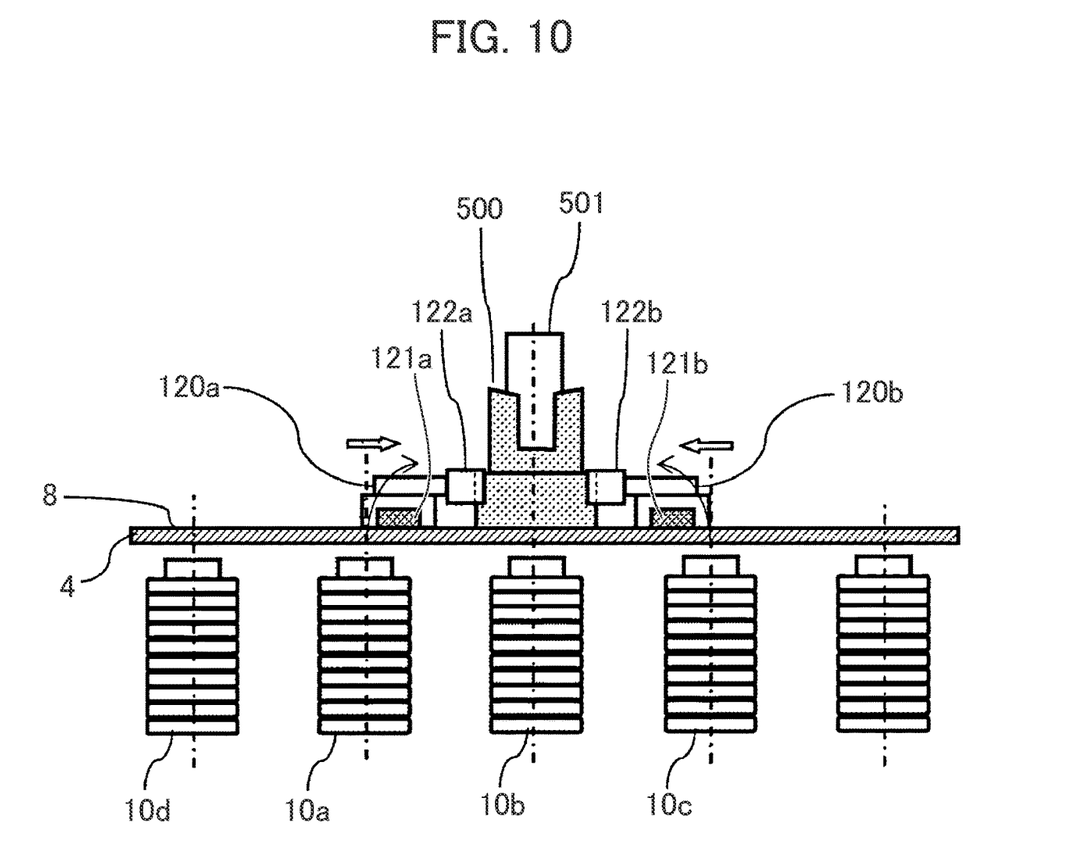
FIG. 10 is a sectional view of a pressing mechanism of Third Embodiment (at pressing).

FIG. 9 and FIG. 10 show the structure of the specimen transport apparatus 21 according to the third embodiment. In this embodiment too, as in the first embodiment, pressing mechanisms 120a and 120b are provided on both sides of the specimen holder 500 and the pressing mechanisms 120a and 120b have permanent magnets 121a and 121b, in which the tip sections 122a and 122b each have a concave portion in the center.

In this embodiment, when centering the specimen holder 500, an electric current is supplied simultaneously to the electromagnetic actuators 10a and 10c just below the pressing mechanisms 120a and 120b in such a direction that a repulsive force is exerted on the permanent magnets 121a and 121b. In addition, an electric current is supplied to the electromagnetic actuator 10b located in the vicinity of the area just below the specimen holder 500 in such a direction that an attraction force is exerted on the permanent magnets 121a and 121b. At this time, the electric current supplied to the electromagnetic actuator 10b should be weaker than to the electromagnetic actuators 10a and 10c.

Consequently, the repulsive force due to the electromagnetic actuators 10a and 10c and the thrust force of the attraction force due to the electromagnetic actuator 10b cause the permanent magnets 121a and 121b of the pressing mechanisms 120a and 120b to be attracted toward the electromagnetic actuator 10b. In other words, in this embodiment, the pressing mechanisms 120a and 120b themselves move in opposite directions so as to sandwich the specimen holder 500 and correct the position error of the specimen holder 500. At this time, although the specimen holder 500 is being attracted by the electromagnetic actuator 10b, the thrust force of the pressing mechanisms 120a and 120b adjacent to it on both sides is stronger and thus centering to the axis of the electromagnetic actuator 10b can be achieved.

When the pressing mechanisms 120a and 120b release the specimen holder 500 from the pressed state, the attraction of the specimen holder 500 by the electromagnetic actuator 10b is stopped and the electromagnetic actuators 10a and 10c switch the repulsion mode to the attraction mode. Consequently, the pressing mechanisms 120a and 120b move to just above the electromagnetic actuators 120a and 120b respectively and releasing of the specimen holder 500 is thus completed.

Next, the method for moving the pressing mechanism 120a back to a transport position d section 8 will be explained. First, an electric current is supplied to the electromagnetic actuator 10a just below the pressing mechanism 120a before movement in such a direction that a repulsive force is exerted on the permanent magnet 121a and at the same time, an electric current is supplied to an adjacent electromagnetic actuator 10d in the direction of movement in such a direction that an attraction force is exerted on the permanent magnet 121a. Consequently, the permanent magnet 121a of the pressing mechanism 120a is attracted toward the electromagnetic actuator 10d and movement of the pressing mechanism 120a to the transport position d section 8 just above the electromagnetic actuator 10d is completed.

According to this embodiment, the pressing mechanism itself can be moved to a desired location on the transport surface 4, so the specimen holder 500 can be positioned at a desired location accurately.

| List of Reference Signs | |
| --- | --- |
| 1 | Specimen transport apparatus |
| 2 | Control device |
| 4 | Transport surface |
| 5 | Transport position a section |
| 6 | Transport position b section |
| 7 | Transport position c section |
| 8 | Transport position d section |
| 10, 10a, 10b, 10c, 10d | Electromagnetic actuator |
| 11 | Specimen transport apparatus |
| 100a, 100b | Pressing mechanism |
| 101a, 101b | Transport surface installation section |
| 102a, 102b | Slide section |
| 103a, 103b | Pressing movable section |
| 104a, 104b | Permanent magnet |
| 105a, 105b | Tip section |
| 110 | Screen |
| 120a, 120b | Pressing mechanism |
| 121a, 121b | Permanent magnet |
| 122a, 122b | Tip section |
| 200, 201, 202 | Transport route |
| 500 | Specimen holder |
| 501 | Specimen container |

What is claimed is:

1. A specimen transport apparatus comprising:
   a specimen holder that holds a specimen container and includes a first magnetic body; and
   a first positioning unit that is arranged under a transport surface to transport and stop the specimen holder by attracting or repelling the magnetic body; and
   a second positioning unit, including a second magnetic body, that presses the specimen holder or the specimen container is arranged on the transport surface,
   wherein the first positioning unit generates a magnetic field on the transport surface by supplying current to an electromagnet, and
   wherein at least part of the second positioning unit presses the specimen holder by the second magnetic body using magnetic force received from the magnetic field generated by the first positioning unit.

2. The specimen transport apparatus according to claim 1, wherein after the first positioning unit transports the specimen holder to a vicinity of a target position and stops the specimen holder, the second positioning unit brings the specimen holder further close to the target position.

3. The specimen transport apparatus according to claim 1, wherein the second positioning unit holds the specimen holder or the specimen container at multiple places.

4. The specimen transport apparatus according to claim 3, wherein, of the second positioning unit, a surface that comes into contact with the specimen holder or the specimen container is provided with a concave portion.

5. The specimen transport apparatus according to claim 3, wherein the second positioning unit has a pressing mechanism that presses the specimen holder or the specimen container, and a screen fixed onto the transport surface.

6. The specimen transport apparatus according to claim 1, wherein at least the part of the second positioning unit moves on the transport surface by the magnetic force received from the magnetic field generated by the first positioning unit.

* * * * *